A. A. ZIEGLER.
VARIABLE RESISTANCE UNIT.
APPLICATION FILED SEPT. 22, 1914.

1,321,873.

Patented Nov. 18, 1919
2 SHEETS—SHEET 1.

Witnesses:
H. B. Davis,
R. Connell.

Inventor:
Alfred A. Ziegler
by Noyes & Harriman
attys

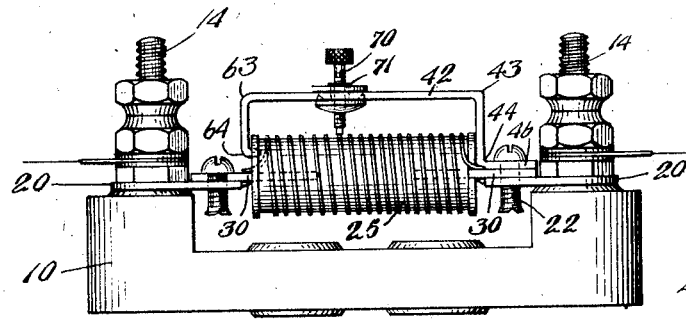
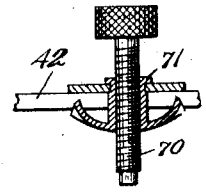
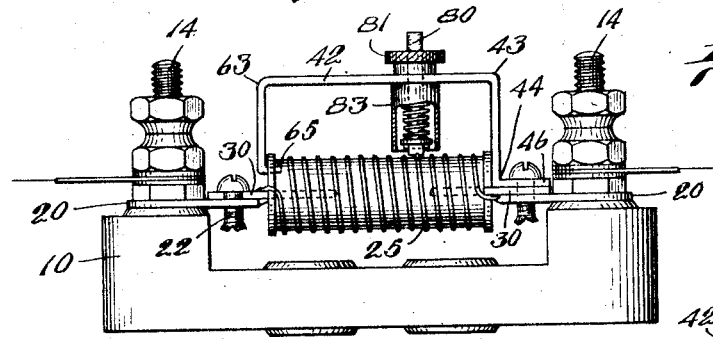
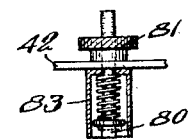
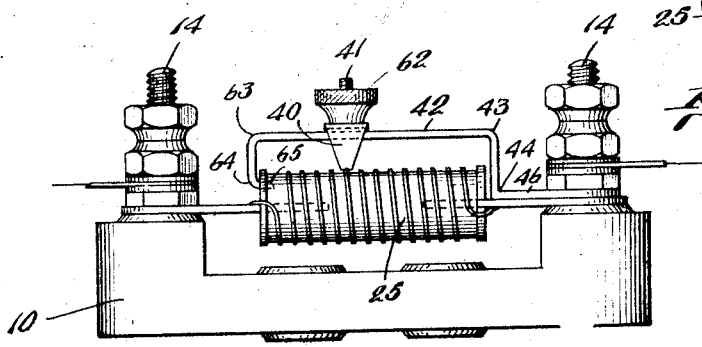

UNITED STATES PATENT OFFICE.

ALFRED A. ZIEGLER, OF BOSTON, MASSACHUSETTS.

VARIABLE-RESISTANCE UNIT.

1,321,873.      Specification of Letters Patent.      Patented Nov. 18, 1919.

Application filed September 22, 1914. Serial No. 863,049.

*To all whom it may concern:*

Be it known that I, ALFRED A. ZIEGLER, a citizen of the United States, residing at Boston, in the county of Suffolk and State of Massachusetts, have invented an Improvement in Variable-Resistance Units, of which the following is a specification.

This invention relates to a variable resistance-unit, and has for its object the construction of a simple form of varying-means which may be applied as an attachment to a resistance-element, and, is particularly designed to be applied to the resistance-element of my application for Letters Patent, Serial No. 824,923, filed March 16, 1914. The varying-means involves a contact-member for engaging the resistance-element at any desired point, which member may be constructed in various ways, and a support for said member, which is detachably connected with the resistance-unit, and means to slidably connect said member to its support, whereby it may be adjusted to any desired position with respect to the resistance-element. The frame bearing the contact-member is coextensive with the length of the resistance-element, and is adapted to be detachably connected to one of the terminal-plates of the resistance-element, and in the particular embodiment of my invention here shown for illustration, wherein the resistance-element involves a spool of insulating material and a resistance-wire coiled thereon and terminal-plates projecting from the ends of said spool, one end of said supporting-frame may be connected, preferably detachably, with a terminal-plate at one end of the spool and its other end arranged for engagement with the other end of the spool.

Fig. 6 is a side-elevation of a variable resistance-unit having a modified form of contact-member.

Fig. 7 is an enlarged sectional detail view of the contact-member of Fig. 6.

Fig. 8 is a side-elevation of a variable resistance-unit having another modified form of contact-member.

Fig. 9 is an enlarged sectional detail view of the contact-member of Fig. 8.

Fig. 10 is a modified form of variable resistance-unit having varying-means embodying this invention.

Figure 1:
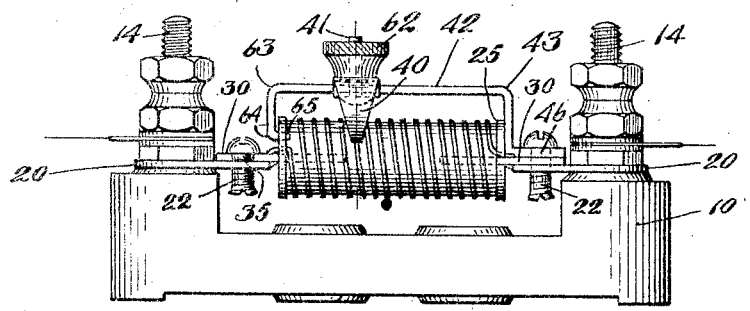
Figure 1 is a side-elevation of a variable resistance-unit embodying this invention.
Figure 2:
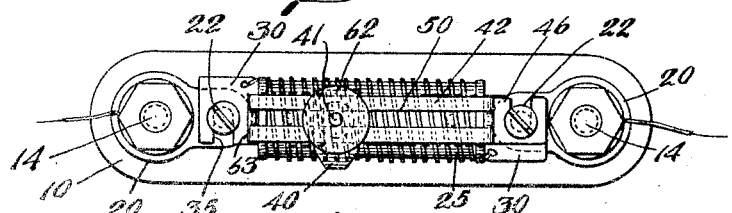
Fig. 2 is a plan view of the same.
Figure 3:
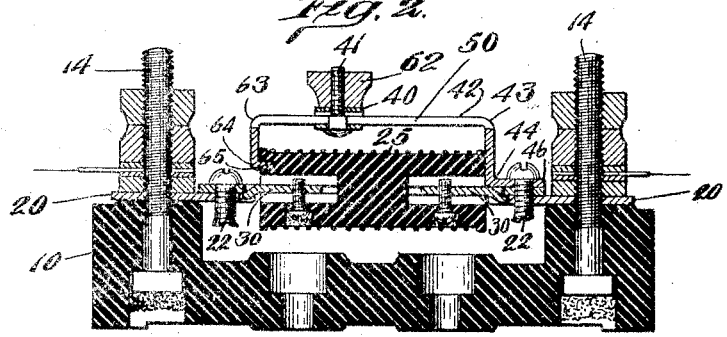
Fig. 3 is a longitudinal vertical section of the same.
Figure 4:
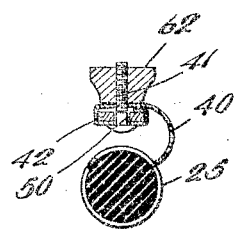
Figs. 4 and 5 are sectional detail views of the contact-member, its support and means for holding the contact-member in adjusted position.
Figure 5:
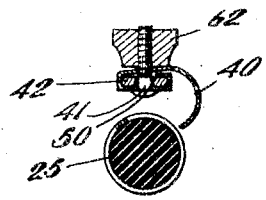

In the embodiment of my invention shown in Figs. 1 to 5 the means for varying the resistance is shown as applied to the resistance-unit of my application #824,923, aforesaid, wherein 10 represents a base of insulating material, such as porcelain, and 14 screws having nuts suitably arranged thereon to constitute binding-posts; 20, 20 represent flat supporting-plates which are arranged on the binding-posts, said plates having end-portions which are extended toward each other. Said end-portions have holes through them for screws 22 for the connection therewith of the terminals of the resistance-element. The resistance-element comprises a spool 25, composed of insulating material, as porcelain, on which one or more layers of resistance-wire are wound, and said spool has sockets at its ends which receive terminal-plates 30, and the ends of the coil of wire are connected to said terminal-plates. The terminal-plates have transversely arranged recesses 35, in their sides to admit of their engagement with the shanks of the screws 22, on the supporting-plates; or for direct engagement with the binding-posts as represented in Fig. 10. The resistance-element is therefore detachably connected with its support. This form of resistance-element is here shown for the reason that my improved varying-means is especially well suited for attachment thereto, but obviously the varying-means may be attached to other forms of resistance-elements and associated with other forms of resistance-units.

40 represents a contact-member which is arranged for engagement with the resistance-element, as for instance, with the wire of the resistance-coil, and said member is borne by, and is slidably connected with a supporting-frame 42, which is extended lengthwise of the resistance-coil, and, preferably, from end to end thereof. As here shown said supporting-frame is composed of sheet-metal which is cut and bent to the desired form. It has two right-angle bends 43, 44, at one end thereby providing a flat end-portion or ear 46, which end portion has a transverse recess in one side of it, admitting of its engagement with the shank of the screw 22 on a supporting-plate to which one of the terminal-plates of the resistance-element is connected, so that one end of said frame is mechanically and also electrically connected with one of the terminal-plates of the resistance-element.

On account of the frame to which the contact-member is slidably connected being made quite long, it is preferable to provide means for holding its end opposite its point of attachment with the terminal-plate in fixed position, and, as here shown, said end-portion of the frame is bent downward at 63 and inward at 64, and has an inwardly extended finger 65, and said bent portion of the frame extends over the end of the spool for a short distance, and its finger is arranged to enter a small hole which may be formed in the end of said spool. This means of holding said end of the frame also admits of its ready attachment to and detachment from the spool. And said support has a nut 62 thereon which may be turned thereby to secure the support in any position on the frame which it may be set.

As represented in Figs. 1 to 5 and Fig. 10, the contact-member 40 is composed of sheet metal and bent to form a curved finger, the free end of which has a small notch to enable its end-portion to engage the wire, of the resistance-coil, and the other end of said finger is carried over and around the frame 42, to form a loop which embraces the frame, thereby to permit of its sliding connection therewith, and said end-portion of the finger has holes through it for a screw 41, and said screw extends through and is movable along a slot 50, which is formed throughout the length of the supporting-frame 42, and a nut 62, is arranged on said screw. As the screw is moved along the slot 50 the curved contact-member or finger is moved by it. Said contact-finger, being composed of sheet metal, and bent, as shown, is yielding, so that it yieldingly engages the resistance-element with a firm pressure to insure a good contact therewith. When the nut 62 is turned down tightly said contact-finger is pressed into firm engagement with the wire, as well as being securely held in its different positions of adjustment. The resistance is varied by moving the contact-member along its supporting-frame to engage the resistance-wire at different points. The structural form of varying-means here shown possesses many advantages on account of its simple character and ease of attachment to the resistance-element.

In view of the fact that the contact-member is slidably arranged on the supporting-frame, and that the means for holding it in fixed position are associated with it, and that the supporting-frame is designed for attachment to the resistance-unit, it will be seen that the entire varying-means may be made assembled and sold as a separate unit, and subsequently attached to the resistance element.

Other modified embodiments of my invention are here illustrated, and, referring to Figs. 6 and 7 the supporting-frame bearing the contact-member is substantially the same as that heretofore described, but a different form of contact-member is shown, which member consists of a contact-screw 70, passing through a nut 71, which is slidably connected with the supporting-frame 42, and the end of said screw is arranged for engagement with the resistance-wire; and referring to Figs. 8 and 9 the contact-screw 80 passes up through the slot 50 in the supporting-frame, and has a nut 81 arranged upon it, and said nut engages the upper side of the supporting-frame, while beneath said frame a spring is arranged on the contact-screw, the upper end of which bears against the upper end of a housing 83 and incloses the lower end-portion of the contact-screw, and the lower end of which bears against a flange or washer on the screw, and the tendency is for the spring to thrust the contact-screw into yielding engagement with the resistance-wire while the nut holds it in sliding engagement with the supporting-frame. In this latter modification upon turning up the nut the contact-screw is raised free from the engagement with the wire, yet its connection with the supporting-frame, by reason of the spring bearing against the underside of said frame, permits said nut and contact-screw to be moved along in the slot in the supporting-frame.

I claim:—

1. In a variable resistance-unit, the combination with a resistance-element having terminal-plates, of a manually operable contact-member arranged for engagement with and disengagement from the resistance-element, a supporting-frame for said member which is arranged for detachable connection with one of the terminal-plates, said frame being out of the resistance circuit when the member is free of connection with the resistance element, and means to slidably connect said member with said frame, substantially as described.

2. In a variable resistance-unit, the combination with a resistance-element having terminal-plates, of a manually operable contact-member arranged for engagement with and disengagement from the resistance-element, an elongated slotted supporting-frame extended over the resistance-element and having one end arranged for detachable connection with one of the terminal-plates, the opposite end of the frame being at all times free from electrical connection with the circuit including the resistance element, and means to slidably connect said member with said slotted frame, substantially as described.

3. In a variable resistance-unit, the combination with a resistance-element having terminal-plates, of a manually operable contact-member made as a curved finger, one end of which is arranged for slidable connection with its supporting-frame and its free end is arranged for engagement with and disengagement from the resistance-element, an elongated slotted supporting-frame extended over said resistance-element and arranged for detachable connection with one of the terminal-plates and means for moving said contact-member along on its supporting-frame and for holding it in any position it may be set, substantially as described.

4. In a variable resistance-unit, the combination with a spool and coil of wire thereon, terminal-plates at the ends of said spool to which the ends of said wire are attached, of a contact-member arranged for engagement with said wire, a supporting-frame for said member which is extended over and arranged lengthwise of said spool and is arranged for detachable connection with one of the terminal-plates, and means to slidably connect said member with said frame, substantially as described.

5. In a variable resistance-unit, the combination with a spool and coil of wire thereon, terminal-plates at the ends of said spool to which the ends of said wire are attached, of a contact-member arranged for engagement with said wire, a supporting-frame for said contact-member which is extended over and arranged lengthwise of said spool, and is arranged at one end for detachable connection with one of the terminal-plates, and its other end is arranged for detachable engagement with the spool and means to slidably connect said member with said frame, substantially as described.

6. In a variable resistance-unit, the combination with a spool and coil of wire thereon, terminal-plates at the ends of said spool to which the ends of said wire are attached, of a contact-member arranged for engagement with said wire, an elongated slotted supporting-frame for said contact-member which is extended over and arranged lengthwise said spool, and has a recessed ear at one end for detachable connection with one of the terminal-plates, and has an inturned finger at its other end for engagement with the spool and means to slidably connect said member with said frame, substantially as described.

7. In a variable resistance-unit, a base having binding-posts arranged thereon, and having supporting-plates connected with said binding-posts, a resistance-element having terminal-plates for detachable connection with said supporting-plates, a contact-member arranged for engagement with said resistance-element, a supporting-frame for said contact-member arranged for detachable connection with one of the terminal-plates and with one of the supporting-plates and means to slidably connect said contact-member with said supporting-frame, substantially as described.

8. An adjustable resistance including an insulating block, two binding posts thereon, a bared resistance coil supported on the block in circuit with the binding-posts, a bar detachably connected to one of the posts and ranging along the coil, a sliding guide movable longitudinally on the bar, a contact extending below the guide, and a screw and nut for holding the guide to the bar and permitting adjustment of the contact to different convolutions of the coil.

In testimony whereof I have signed my name to this specification in the presence of two subscribing witnesses.

ALFRED A. ZIEGLER.

Witnesses:
B. J. NOYES,
H. B. DAVIS.